(No Model.)
C. J. JUTSON & F. A. POUPARD.
HORSESHOE.
No. 393,835. Patented Dec. 4, 1888.
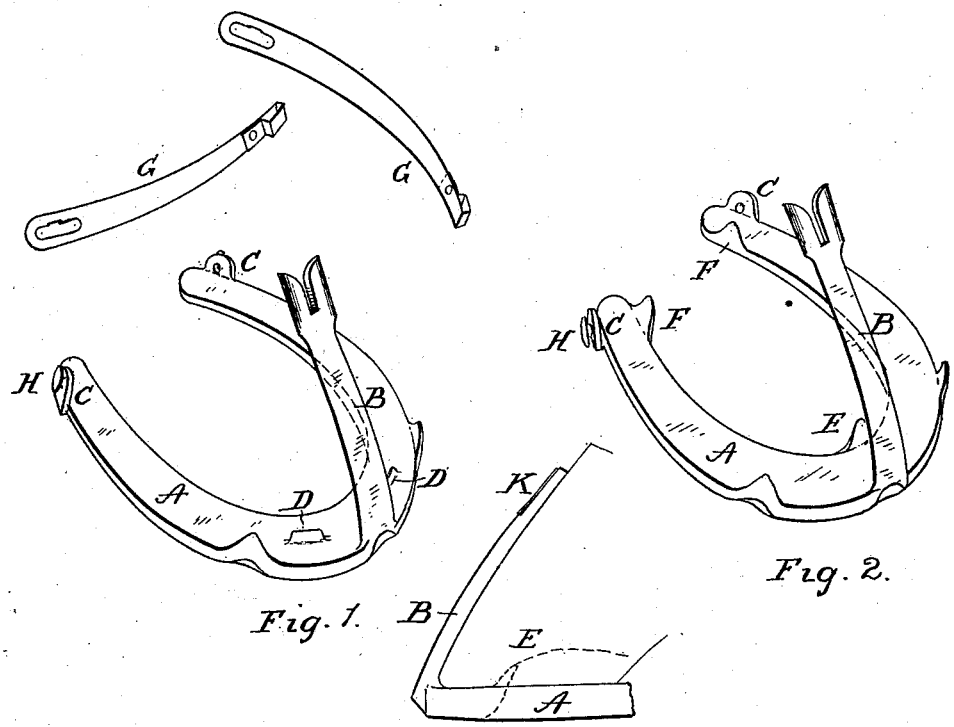
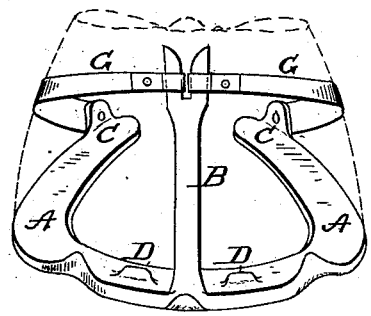
Fig. 3.
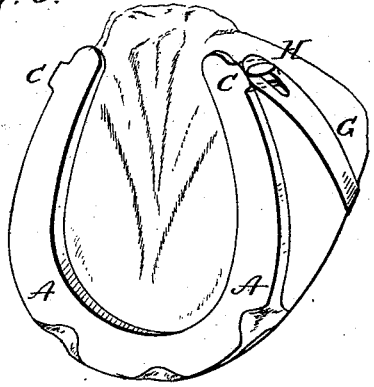
Fig. 4.
Witnesses,
H. A. Lamb,
Joseph Baker.
Inventors.
Charles James Jutson,
Frederick Abraham Poupard.
By their Attorney

UNITED STATES PATENT OFFICE.

CHARLES JAMES JUTSON AND FREDERICK ABRAHAM POUPARD, OF LONDON, ENGLAND.

HORSESHOE.

SPECIFICATION forming part of Letters Patent No. 393,835, dated December 4, 1888.

Application filed March 22, 1887. Serial No. 232,048. (No model.)

*To all whom it may concern:*

Be it known that we, CHARLES JAMES JUTSON and FREDERICK ABRAHAM POUPARD, residents of London, England, and subjects of the Queen of Great Britain, have invented an Improvement in Shoes for Horses and other Hoofed Animals, of which the following is a specification.

Our invention relates to nailless shoes for horses or other hoofed animals, and is designed to effect the secure attachment of the shoe to the hoof without penetrating the hoof by nails and without such pressure on the hoof as may be injurious or painful to the animal.

Our invention consists in certain novel combinations of parts, hereinafter set forth and claimed.

In order that our invention may be the better understood, we now proceed to describe the same, reference being made to the accompanying drawings.

Figure 1 is a general perspective view of our improved horseshoe and tightening-band. Fig. 2 shows our improved horseshoe with modified form of internal clips. Fig. 3 shows a front elevation of a horse-hoof in dotted lines with our improved horseshoe attached thereto. Fig. 4 is a view of the under side of the hoof fitted with our improved horseshoe. Fig. 5 is an enlarged detail of a device by which the band is locked upon the front shoe tongue or clip.

A is the shoe, formed with one long tongue, B, and smaller tongues or clips, C C, projecting upward from the outer edge of the shoe, so as to lie upon the front and sides of the hoof to keep the hoof in position on the shoe. These projecting tongues or clips should be forged or stamped solid with the shoe or attached as securely as possible thereto, it being intended that the shoe and tongues or clips shall be considered as one piece. The exact arrangement of tongues and clips herewith described and illustrated is of importance to our invention as enabling the shoe-frame to be readily applied to the hoof and to be removed therefrom. To further secure the shoe from slipping upon the hoof, we make projecting tongues D D upon the upper tread of the shoe, as in Fig. 1, or projecting tongues or clips E on the inner edge of the shoe, and clips F F, as in Fig. 2, which may be fixtures or adjustable, projecting upward from the rear inner edge of the shoe. These tongues or clips on the inner edge of the shoe or on the tread are caused to engage into the natural recess of the hoof, where on the inner edge, as in Fig. 2, or to be fitted or embed themselves into the under face of the hoof when they are constructed as in Fig. 1. We secure the shoe and frame to the hoof by a band or bands, G G, of light steel or other suitable material, pivoted at each end at the rear of the hoof to points C C, as near as possible to the upper edge of the heel of the shoe and secured to the extremities of the high front projecting tongue, B.

The point of attachment of the ends of the band G to the heel of the shoe is of importance, as it must be close down to the upper edge of the shoe to prevent the heel of the shoe from dropping forward from the hoof, like a bell-crank lever, to which it would tend to be liable if the point of attachment were too high above the shoe.

The band or bands G G may be tightened by bringing the bent or hooked ends of the band or bands into a slot in the end of the front tongue, B, the face of the said slot being made wedge-shaped, so that tension may be obtained by forcing down the ends of the said steel bands into the said slot, so as to force the band also over an increasing diameter of the hoof. The other ends of the bands are secured on notched pins H H or other convenient attachment at the heel, as before described. These pins may be fixtures and are made with oval heads, the bands being provided with oval holes, so that they can be pushed over the head of the pins in a given position; but on being tightened up for work the bands are securely held on the heel-pins.

In order to lock the front ends of the band or bands securely on the tongue B, we provide a spring-tongue, K, Fig. 5, or other similar detent or catch, so that when the loops of the band or bands G G are forced into place, as in Fig. 3, the spring-detent locks them securely in the required position.

Though for convenience of description we have specified a single tongue with beveled engaging-faces, yet it is obvious that more than one might be used. Further, for the connecting-bands we may equivalently use chains, wire web, or other suitable material.

Having now particularly described and ascertained the nature of our invention and in what manner the same is to be performed, we declare that what we claim is—

1. A nailless shoe provided at its front with an upwardly-projecting tongue curved to approximate the configuration of the hoof-front, and a pair of securing-straps, each pivotally connected at its rear end to the heel of the shoe, and having a loop at its front end to removably engage the upper portion of said tongue, substantially as described.

2. A nailless shoe provided at its front with an upwardly-projecting tongue curved to approximate the configuration of the hoof-front, and bifurcated at its upper end to form wedge-shaped terminal portions, and a pair of straps, each pivotally secured at its rear end to the heel of the shoe and having at its front end a loop to removably engage one of said wedge-shaped portions, substantially as described.

3. A nailless shoe provided with inner tongues or clips and having an upwardly-projecting tongue curved to approximate the configuration of the hoof-front, and a pair of straps pivotally secured at their rear ends to the heel of the shoe and provided at their front ends with loops to be forced downward into engagement with the upper part of the tongue, substantially as described.

4. A nailless shoe provided at its front with an upwardly-projecting tongue curved to approximate the configuration of the hoof-front, a pair of straps pivotally secured at their rear ends to the heel of the shoe and having loops at their front ends to removably engage the upper portion of the tongue, and a supplemental detent or detents for retaining said loops in engagement with the tongue, substantially as described.

In testimony whereof we have signed our names to this specification in the presence of two subscribing witnesses.

CHARLES JAMES JUTSON.
   FREDERICK ABRAHAM POUPARD.

Witnesses:
 SAM. P. WILDING,
 RICHARD A. HOFFMANN.